No. 782,890. PATENTED FEB. 21, 1905.
F. C. ZUMDAHL.
MECHANICAL MOVEMENT.
APPLICATION FILED SEPT. 22, 1904.

Witnesses:
Giles L. Wiley
E. Behel.

Inventor:
Frederick C. Zumdahl
By A. O. Behel
Atty.

No. 782,890. Patented February 21, 1905.

UNITED STATES PATENT OFFICE.

FREDERICK C. ZUMDAHL, OF ROCKFORD, ILLINOIS.

MECHANICAL MOVEMENT.

SPECIFICATION forming part of Letters Patent No. 782,890, dated February 21, 1905.

Application filed September 22, 1904. Serial No. 225,484.

*To all whom it may concern:*

Be it known that I, FREDERICK C. ZUMDAHL, a citizen of the United States, residing at Rockford, in the county of Winnebago and State of Illinois, have invented certain new and useful Improvements in Mechanical Movements, of which the following is a specification.

This invention relates to a new mechanical movement in which beveled friction means are employed as a driving means for two shafts and each shaft having a connection with the part to be driven in order that there will be no cramping of the main driving friction on its shaft.

Figure 1:
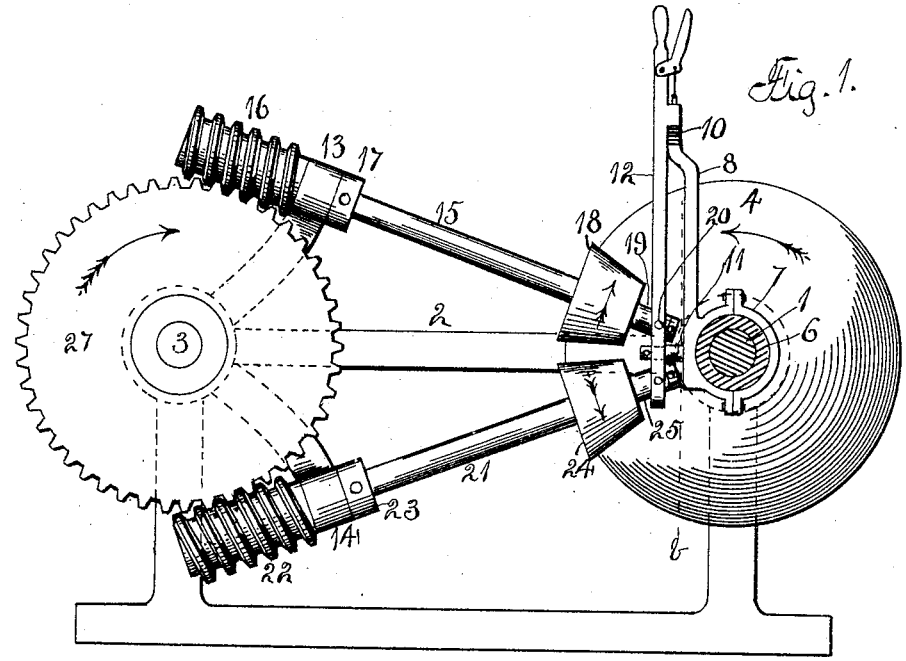
Figure 2:
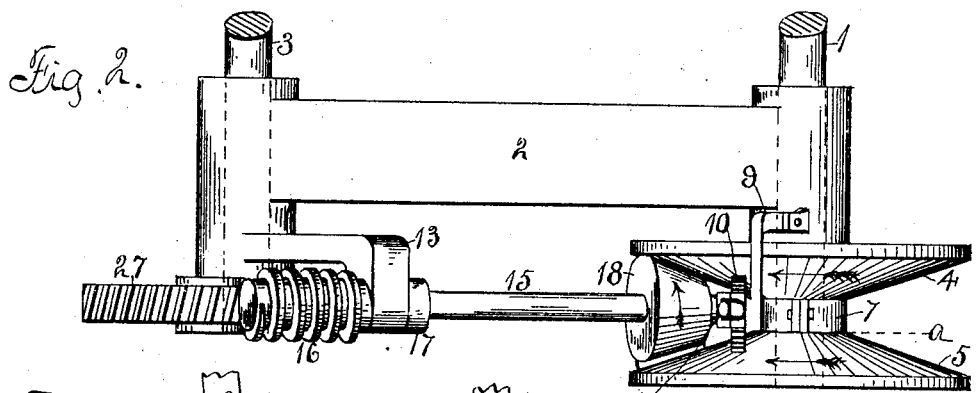
Figures 3, 4, 5:
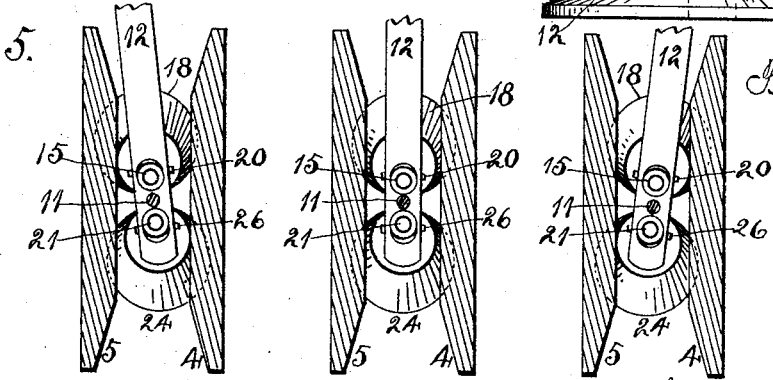

In the accompanying drawings, Figure 1 is a section on dotted line *a*, Fig. 2. Fig. 2 is a plan view of my improved mechanical movement. Figs. 3, 4, and 5 are sections on dotted line *b*, Fig. 1, showing the different positions of the cones.

The shaft 1 will be termed the "driver" and is supported in a suitable frame 2. The shaft 3 will be termed the "driven" shaft and is also supported by the frame 2. The driving-shaft may be rotated by any suitable power, and the driven shaft may be employed to transmit power to any mechanism to which it can be applied.

To the shaft 1 is secured a driving element, in this instance in the form of a wheel having the two surfaces 4 and 5. Around the central hub 6 of the driving element is located a bracket 7, having an upward extension 8 and an overhanging arm 9, having its free end connected to the main frame 2. The upper end of the extension 8 is provided with teeth 10. From the bracket 7 extends a stud 11. Upon the stud 11 is pivotally mounted a hand-lever 12, which is provided with the usual thumb-lever and dog engagement with the teeth 10.

From the main frame extends two bearings 13 and 14. The bearing 13 supports a shaft 15. This shaft has a worm 16 secured to one end and located against the bearing 13 and a collar 17 located against the other end of the bearing. A cone 18 is secured to the shaft 15 and a sleeve 19 is located on the shaft and to which the hand-lever 12 is connected by the pins 20. The bearing 14 supports a shaft 21. This shaft has a worm 22 secured to one end and located against the bearing and a collar 23 located against the other end of the bearing. A cone 24 is secured to the shaft 21, and a sleeve 25 is located on the shaft and to which the hand-lever 12 is connected by the pins 26. The shafts 15 and 21 radiate from the center of the driving element, and the cones 18 and 24 are smaller than the space between the faces 4 and 5 of the driving element.

By means of the hand-lever 12 the cone 18 may be pressed in engagement with the face 4 of the driving element and the cone 24 in engagement with the face 5 of the driving element, as shown at Fig. 3. By means of the hand-lever both cones can be held free of engagement with the faces of the driving element, as shown at Fig. 4. At Fig. 5 the hand-lever holds the cones 18 in engagement with the face 5 of the driving element and the cone 24 in engagement with the face 4 of the driving element. When the cones are held free of the driving element, they will remain at rest. When in engagement with the faces of the driving element, as shown at Fig. 3, the shafts will be revolved in the direction indicated by the arrows thereon, and when in the positions shown at Fig. 5 the shafts will be revolved in the opposite direction. As each shaft has a worm engagement with the worm-wheel 27, secured to the shaft 3, and the worms located on opposite sides of the worm-wheel, it is evident that the strain on the worm-wheel will be equalized, which will reduce the friction of the shaft 3 in its bearings and will increase the driving power of the shaft.

By the employment of the two cones, one bearing against the face 4 of the driving element and the other against the face 5 of the driving element, it will be seen that there will be no transverse strain on the shaft 1, which would occur if only one cone element was employed, and at the same time double the power is transmitted to the driven shaft.

In the drawings I have shown the driving element in the form of a wheel having a central hub and two beveled surfaces, in place of which two separate beveled surfaces might be employed and secured to the shaft without departing from the scope of my invention.

I claim as my invention—

1. A mechanical movement comprising a driving element having two beveled friction-surfaces, two shafts having a connection with the part to be driven, a cone supported by each shaft, one of the cones adapted to be placed in engagement with one of the beveled friction-surfaces and the other cone adapted to be placed in engagement with the other beveled friction-surface.

2. A mechanical movement comprising a driving element having two beveled friction-surfaces, two shafts having a connection with the part to be driven, a cone supported by each shaft, one of the cones adapted to be placed in engagement with one of the beveled friction-surfaces, the other cone adapted to be placed in engagement with the other beveled friction-surface, and means for disengaging the cones from the beveled friction-surfaces.

3. A mechanical movement comprising a driving element having two beveled friction-surfaces, two shafts having a connection with the part to be driven, a cone supported by each shaft, one of the cones adapted to be placed in engagement with one of the beveled friction-surfaces, the other cone adapted to be placed in engagement with the other beveled friction-surface, and means for simultaneously transferring the cones from their respective beveled friction-surfaces into engagement with the other beveled friction-surface.

4. A mechanical movement comprising a driving element having two beveled friction-surfaces, a worm wheel, two shafts, a worm supported by each shaft and located in engagement with the worm-wheel on opposite sides of the center of the wheel, a cone supported by each shaft, one of the cones adapted to be placed in engagement with one of the beveled friction-surfaces and the other cone adapted to be placed in engagement with the other beveled friction-surface.

5. A mechanical movement comprising a driving element having two beveled friction-surfaces, a worm-wheel, two shafts, a worm-wheel supported by each shaft and located in engagement with the worm-wheel on opposite sides of the center of the wheel, a cone supported by each shaft, one of the cones adapted to be placed in engagement with one of the beveled friction-surfaces, the other cone adapted to be placed in engagement with the other beveled friction-surface, and means for disengaging the cones from the beveled friction-surfaces.

6. A mechanical movement comprising a driving element having two beveled friction-surfaces, a worm-wheel, two shafts, a worm supported by each shaft and located in engagement with the worm-wheel on opposite sides of the center of the wheel, a cone supported by each shaft, one of the cones adapted to be placed in engagement with one of the beveled friction-surfaces, the other cone adapted to be placed in engagement with the other beveled friction-surface, and means for simultaneously transferring the cones from their respective beveled friction-surfaces into engagement with the other beveled friction-surface.

FREDERICK C. ZUMDAHL.

Witnesses:
A. O. BEHEL,
E. BEHEL.